United States Patent [19]

Roberts et al.

[11] Patent Number: 5,046,869

[45] Date of Patent: Sep. 10, 1991

[54] CONVEYOR BEARING ASSEMBLY

[75] Inventors: Clark A. Roberts; Ian Smith, both of Maryville, Tenn.

[73] Assignee: Wyko Incorporated, Greenback, Tenn.

[21] Appl. No.: 547,916

[22] Filed: Jul. 3, 1990

Related U.S. Application Data

[63] Continuation-in-part of Ser. No. 311,604, Feb. 16, 1989.

[51] Int. Cl.⁵ .................. F16C 43/04; F16C 13/00; B65G 39/10
[52] U.S. Cl. .................. 384/537; 198/842; 384/546
[58] Field of Search ............ 198/825, 842; 384/543, 384/546, 539, 537

[56] References Cited

U.S. PATENT DOCUMENTS

| | | | |
|---|---|---|---|
| 2,825,439 | 3/1958 | Collis | 193/35 |
| 3,086,826 | 4/1963 | Gunnell . | |
| 3,610,387 | 10/1971 | Stein | 193/37 |
| 3,957,147 | 5/1976 | Specht | 193/37 |
| 4,199,052 | 4/1980 | Morris | 384/144 X |
| 4,272,135 | 6/1981 | Hamblin et al. . | |
| 4,277,114 | 7/1981 | Lindegger | 277/56 X |
| 4,315,566 | 2/1982 | Greener et al. | 193/37 |
| 4,339,158 | 7/1982 | Greener et al. . | |
| 4,373,759 | 2/1983 | Greener et al. . | |
| 4,458,957 | 7/1984 | Greener et al. . | |

FOREIGN PATENT DOCUMENTS

| | | | |
|---|---|---|---|
| 0066833 | 5/1969 | German Democratic Rep. | 198/842 |
| 1591174 | 6/1981 | United Kingdom | 198/842 |

Primary Examiner—Thomas R. Hannon
Attorney, Agent, or Firm—Luedeka, Hodges, Neely & Graham

[57] ABSTRACT

A bearing assembly for rotatably supporting a conveyor roller tube for a belt conveyor or the like about a fixed shaft includes a housing to which a roller tube is attached, an end cover positioned on the fixed shaft adjacent one side of the housing, and a bearing interposed between the housing and end cover permitting rotation of the housing relative to the end cover. The housing and end cover cooperate with the bearing in a manner facilitating the assembly of the bearing assembly and preventing axial shifting of the assembly components relative to one another when assembled.

10 Claims, 3 Drawing Sheets

CONVEYOR BEARING ASSEMBLY

This application is a continuation-in-part application of application Ser. No. 311,604 filed Feb. 16, 1989 and entitled IMPROVED BEARING ASSEMBLY FOR CONVEYORS, the disclosure of which is incorporated herein by reference.

This invention relates generally to a bearing assembly for conveyors, such as conveyor rollers and idlers, having a load-supporting roller tube positioned about a frame-supported stationary shaft and wherein a bearing assembly is interposed between the roller tube and shaft for rotation of the tube relative to the shaft.

Bearing assemblies with which this invention is concerned commonly include a housing having a periphery to which an end of a roller tube is attached and a bearing which is positioned between the shaft and the housing so as to permit rotation of the housing about the shaft. An end cover is positioned adjacent one side of the housing and is intended to protect components of the bearing from dirt, water or other undesirable contaminants which may come into contact with the bearing assembly. In order to reduce any likelihood that the bearing assembly will come apart during use, it would be desirable to provide a bearing assembly having components which are joined in a manner which resists separation of the components from one another.

Accordingly, it is an object of the present invention to provide an improved bearing assembly of the aforedescribed class which reduces the likelihood that the bearing assembly will fail during use due to the separation of assembly components from one another.

Another object of the present invention is to provide such a bearing assembly which is uncomplicated in construction and can be assembled with relative ease.

Other objects and advantages of the invention will become known from the following description and drawings in which.

Figure 1:
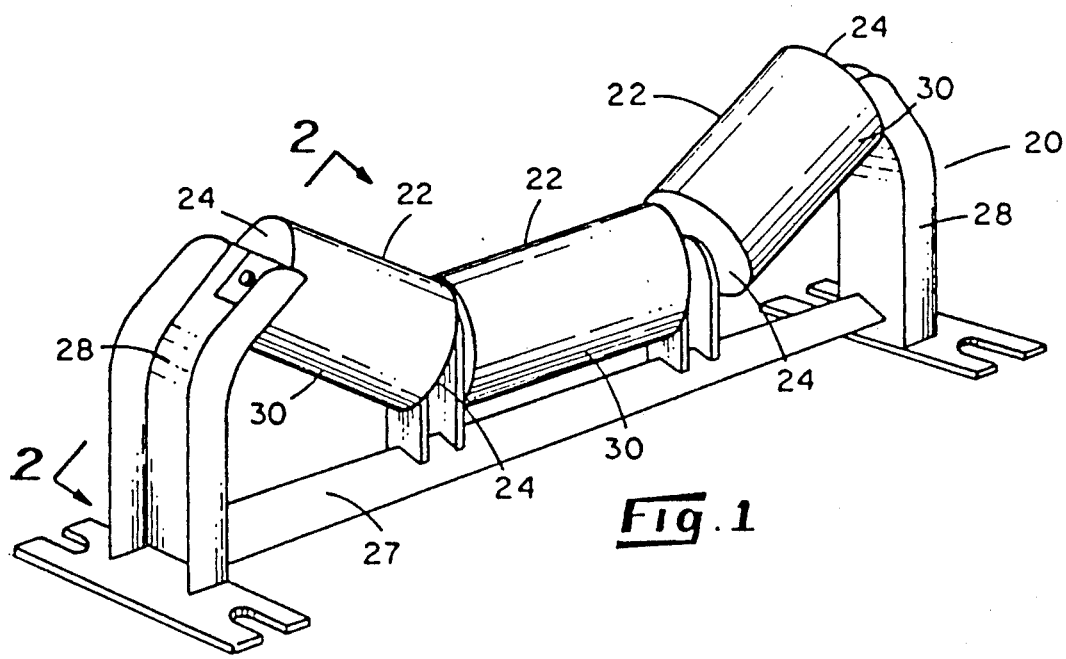
FIG. 1 is a perspective view of a typical conveyor belt support in which an embodiment of the present invention is incorporated.
Figure 2:
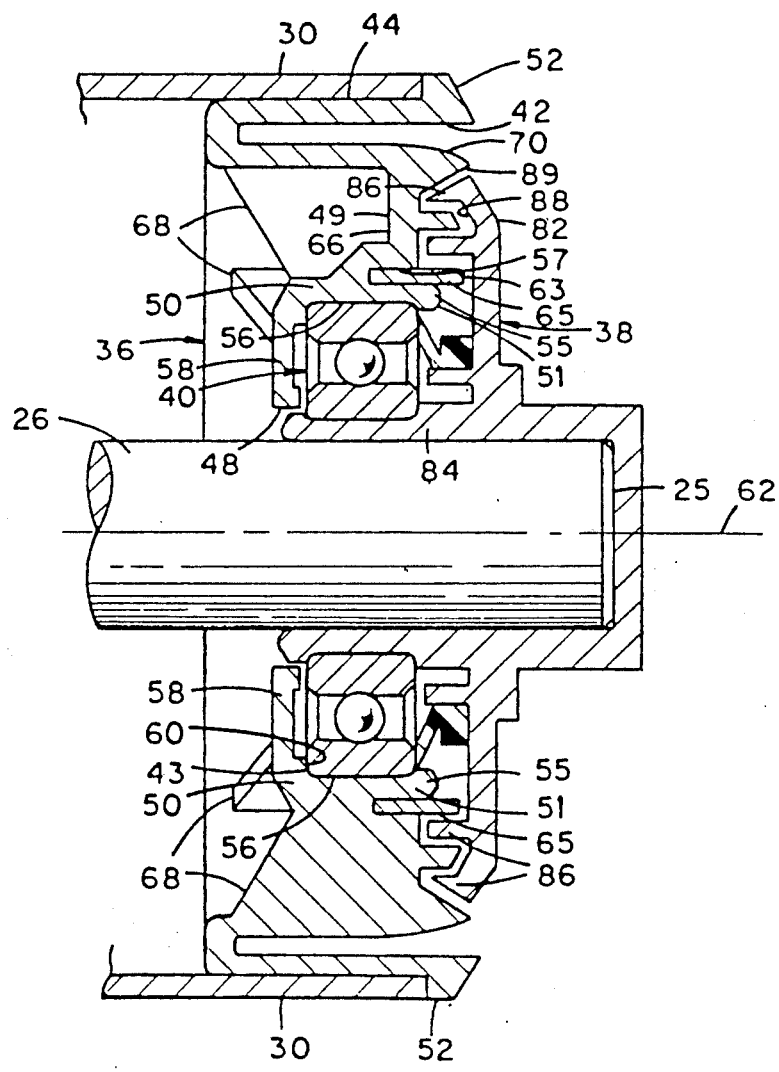
FIG. 2 is a fragmentary cross-sectional view taken along line 2—2 of FIG. 1.

Turning now to the drawings, and considering first FIGS. 1 and 2, there is shown a conveyor idler, generally indicated as 20, including three load-supporting rollers 22 within which bearing assemblies 24 in accordance with the present invention are positioned. Each roller 22 is rotatably mounted upon a fixed shaft 26 which is, in turn, supported upon a rigid frame 27. The frame 27 is positionable upon a support and includes upright support posts 28 for supporting each shaft 26 at its opposite ends. Each roller 22 further includes a hollow roller tube 30 arranged about a corresponding shaft 26 and extending the full length thereof. Two bearing assemblies 24 are positioned on the shaft 26 at the opposite ends thereof permitting rotation of the tube 30 relative to the shaft 26. The two bearing assemblies 24 positioned at opposite ends of the shaft 26 are identical in construction so that the bearing assembly 24 positioned at one end 25 of the shaft 26 will be described.

Figure 3:
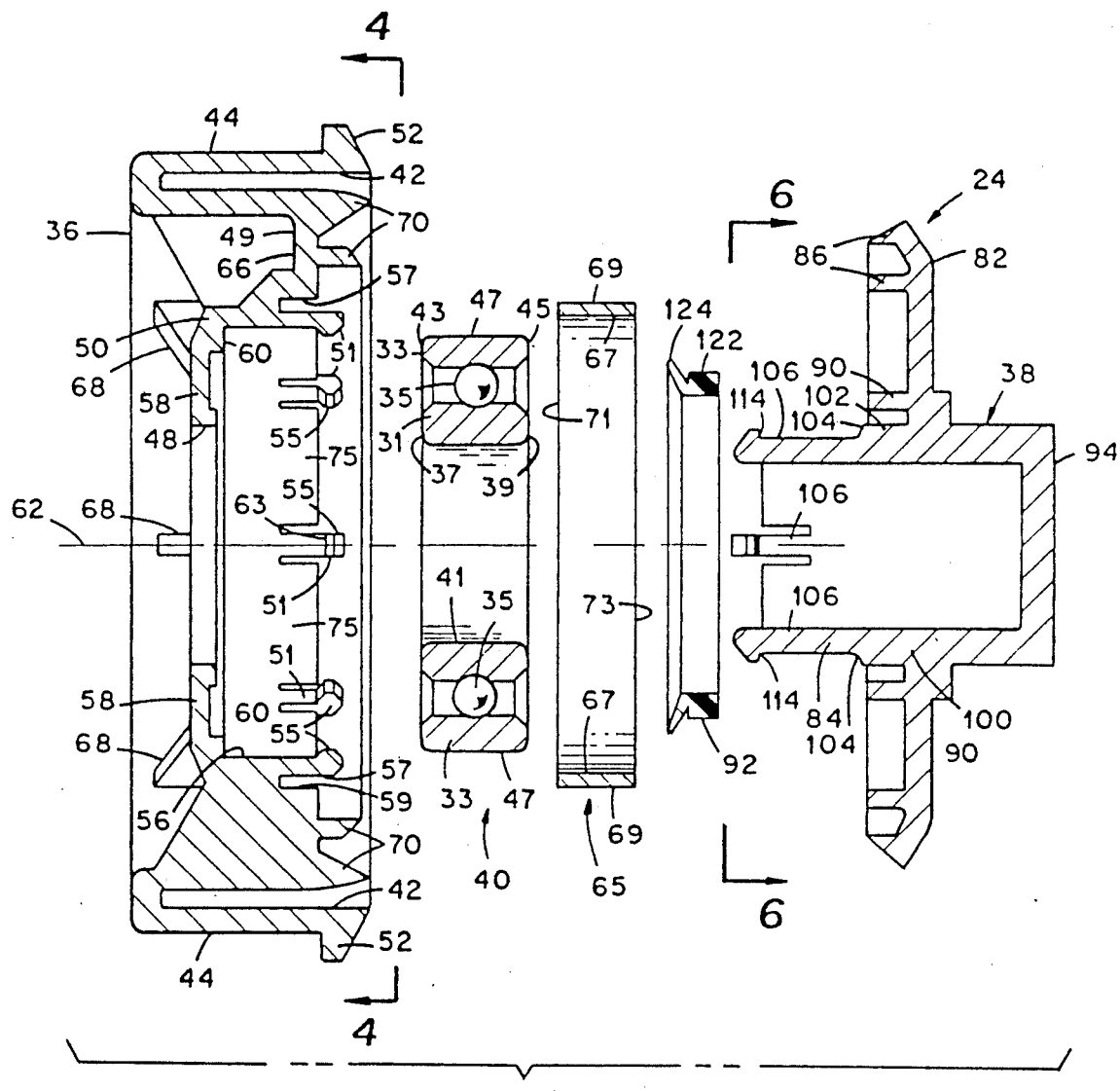
FIG. 3 is a view similar to that of FIG. 2 illustrating the bearing assembly of FIG. 2 in an exploded condition.

With reference to FIGS. 2 and 3, the bearing assembly 24 includes means defining a housing 36 to which the roller tube 30 is swagged, an end cover 38 positioned about the shaft 26 and a bearing 40 interposed between the housing 36 and end cover 38 to accommodate rotation of the housing 36 and roller tube 30 relative to the end cover 38 and shaft 26. As will be explained in greater detail, each of the end cover 38 and housing 36 are joined to the bearing 40 in such a manner that the housing 36 and end cover 38 resist separation from the bearing 40 and thus resist separation from one another.

The bearing 40 of the assembly 40 is a single-row deep groove bearing of standardized construction having a steel inner ring ball race 31, a steel outer ring ball race 33 and a plurality of steel balls 35 held between the inner and outer races 31, 33 by a suitable retainer (not shown) so that the outer race 33 is permitted to rotate relative to and about the inner race 31. In the bearing 40 of the depicted assembly 24, the inner race 31 has two opposite and parallel sides 37, 39 arranged in radial planes of the assembly 24 and a cylindrical inner (bore) surface 41, and the outer race 33 has two opposite and parallel side faces 43, 45 arranged in radial planes of the assembly 24 and a cylindrical outer surface 47.

The housing 36 is preferably constructed of a hard plastic material, such as a suitable Nylon ®, and includes a substantially cylindrical periphery 44 about which the inner wall of the roller tube 30 is swagged and a central opening 48 arranged about the shaft 26 adjacent end 25, and a wall portion 49 extending between the periphery 44 and opening 48. To facilitate the swagging of the tube 30 against the housing periphery 44, a deep groove 42 is defined inwardly of the periphery 44 and opening 48. The groove 42 accommodates an inward collapsing of the outer annulus of the housing 36 as the tube 30 is swagged against the housing periphery 44. For accurately positioning the bearing assembly 24 within the tube 30 prior to the swagging operation, the housing 36 includes an abutment flange 52 located to one side of the periphery 44. As best shown in FIG. 2, the housing 36 is positioned within the tube 30 so that the flange 52 abuts one end of the tube 30.

The wall portion 49 of the housing 36 includes an inner side 66 arranged generally in a radial plane of the housing 36 so as to span the region between the periphery 44 and central opening 48. In order to strengthen the wall portion 49, a plurality of radially-extending webs 68 are provided on the inner side 66.

With reference still to FIGS. 2 and 3, the housing central opening 48 is provided by a body portion 50 of the housing 36 which tightly encircles the outer race 33 of the bearing 40 and which includes means for preventing axial movement of the housing 36 relative to the outer race 33. In this connection, the body portion 50 includes a recess 56 proportioned so that the bearing outer race 33 is tightly received thereby, and so that an inwardly-directed annular portion 58 is provided at the bottom of the recess 56, or on the left side of the recess 56 as shown in FIGS. 2 and 3. The inwardly-directed annular portion 58 includes a shoulder which provides a first abutment surface 60 which is positioned in abutting relationship with one face 43 of the bearing outer race 33, as shown in FIG. 2.

Figure 5:
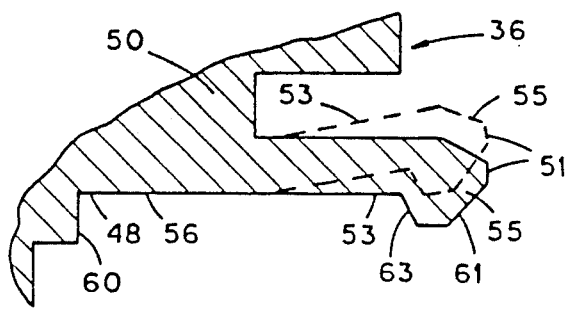
FIG. 5 is a fragmentary cross-sectional view taken along line 5—5 of FIG. 4.

In order to prevent axial movement of the housing 36 relative to the bearing outer race 33, the housing 36 also includes a plurality of finger members 51 joined to the housing body portion 50 for engaging the face 45 of the bearing outer race 33 so that the bearing outer race 33 is captured between the inwardly-directed annular portion 58 and the finger members 51. In this connection and as best shown in FIG. 5, each finger member 51 includes a major portion 53 which extends substantially linearly from the body portion 50 in a direction which is substantially parallel to the rotational axis 62 (FIG. 3) of the housing 36 about the end cover 38 and includes a tab 55 at the end of the major portion 53 opposite the body portion 50. Each tab 55 includes a generally inwardly-directed surface 63 for abutting the face 45 (FIG. 3) of the bearing outer race 33. As best shown in FIG. 5, each tab surface 63 is shaped to accommodate the corner radius of the bearing outer race 33. In the interests of this invention, the area of the tab surfaces 53 which abut the bearing face 45 comprise a second abutment surface which generally opposes and cooperates with the first abutment surface 60 to maintain the bearing race 33 in position within the recess 56.

In the illustrated assembly 40, the housing 36 includes eight finger members 51 which are regularly spaced about the central opening 48. In addition, the faces 43, 45 of the bearing outer race 33 are simultaneously engaged, respectively, by the first abutment surface 60 and the tab surfaces 63 when the bearing 40 is positioned within the recess 56. Accordingly, the distance as measured from the first abutment surface 60 to the tab surfaces 63 corresponds to the width of the outer race 33. Therefore, when positioned between the first abutment surface 60 and the tab surfaces 63, the bearing 40 is tightly held therebetween and prevented from moving axially relative to and through the central opening 48.

It is a feature of the assembly 24 that the finger members 51 are adapted to resiliently flex radially outwardly relative to the housing body portion 50 from an unflexed condition to accommodate the insertion of the bearing 40 into the central opening 48 during assembly and return to an unflexed condition when the bearing 40 is positioned within the central opening 40 so that its tab surfaces 63 are positioned in abutting engagement with the face 45 of the bearing outer race 33. To this end, each finger member 51 is relatively narrow in width, and the housing body portion 50 is formed with a groove 57 (FIG. which provides an annular space 59 which encircles the finger members 51. In the illustrated assembly 24, the groove 57 opens in the same direction in which the finger member 51 extend from the housing body portion 50. Thus, the flexibility of the material, e.g. Nylon ®, out of which the narrow finger members 51 are constructed and the space 59 provided outboard of the finger members 51 permits the finger members 51 to be forcibly flexed radially outwardly from an unflexed condition as illustrated in solid lines in FIG. 5 to a flexed condition as illustrated in phantom in FIG. 5. The finger members 51 possess sufficient resiliency so that upon removal of the force from the finger members 51 which effected the flexure, the memory of the finger members 51 return the finger members 51 to the unflexed condition.

To facilitate the flexing of the finger members 51 outwardly as the bearing 40 is positioned within the housing recess 56, each tab 55 includes an end surface 61 which is sloped in the manner shown in FIG. 5. When positioning the bearing 40 within the recess 56, the bearing 40 is 10 aligned with the central opening 48 and arranged so that the face 43 of its outer race 33 is positioned in engagement with the tab sloped surfaces 61 and then forcibly moved into the central opening 48 until the outer race face 43 abuts the first abutment surface 60. As the bearing 40 is moved into the central opening 48, the outer race 33 and tabs 55 act as cam and cam followers, respectively, in that the peripheral outer surface 47 of the race 33 moves along the sloped surfaces 61 in a manner forcing the tabs 55 radially outwardly to the FIG. 5 flexed condition. When the outer race 33 engages the first abutment surface 60, the tabs 55 clear the bearing outer surface 47 and the memory of the finger members 51 return the finger members 51 to the FIG. 5 unflexed condition so that the tab surfaces 63 are positioned in abutting engagement with the face 45 of the outer race 33.

To prevent the finger members 51 from flexing radially outwardly when the bearing 40 is positioned within the housing recess 56 to a condition at which the bearing 40 can be moved out of the recess 56, the bearing assembly 24 includes an insertable ring 65 positionable within the groove 57 of the housing body portion 50. The ring 65 is sized in such a relationship with the size of the groove 57 that the ring 65 is tightly held between the walls of the groove 57 when positioned therein. The ring 65 is preferably constructed of a hard plastic material, such as a suitable Nylon ®, and as best shown in FIG. 3, includes cylindrical inner and outer surfaces 67, 69, respectively, and generally planar side faces 71, 73, respectively.

During assembly of the bearing assembly 24, the ring 65 is positioned within the groove 57 after the bearing 40 has been positioned within the housing recess 56 and the finger members 51 return to their unflexed condition so that the bearing outer race 33 is captured between the first abutment surface 60 and the tab surfaces 63. The groove 57 is then in condition (e.g. unobstructed by the finger member tabs 55) for receiving the ring 65 inserted facewise through its opening until one of the ring faces 71 engages the bottom of the groove 57. With the ring 65 thus received by the groove 57, the finger members 51 are tightly encircled by the ring 65 and prevented from flexing outwardly to the FIG. 5 flexed condition which may otherwise permit the bearing 40 to shift axially relative housing 36 and out of the recess 56. The bearing 40 therefore cannot be removed from the housing 40 as long as the ring 65 is positioned within the groove 57, and the ring 65 remains snugly retained by the groove 57 during rotation of the housing 36 so that the bearing 40 cannot separate from the housing 36 during use of the assembly 24.

As shown in FIG. 2, the ring 65 is sized so that the side face 73 of the ring 65 protrudes out of the groove 57 when received thereby. In addition and as best shown in FIG. 3, the housing body 50 includes a rigid section 75 positioned between adjacent finger members 51 so as to substantially fill the space therebetween. These rigid sections 75 provide suitable inner surfaces for engaging the peripheral outer surface 47 of the bearing outer race 33 and suitable outer surfaces for engaging the inner surface 67 of the ring 65 when the bearing assembly 24 is assembled.

With reference again to FIG. 2, the outer side of the housing wall 49 and the ring 65 cooperate with the end cover 38 so as to define a labyrinth passageway 88 which permits relative rotation between the wall portion 49 and end cover 38 and which inhibits the passage of dirt and other contaminants which may come into contact with the bearing assembly 24 through the passageway 88. Such labyrinth passageways are common in bearing assemblies of this class, and an example of another labyrinth is shown and described in U.S. Pat. No. 4,458,957. In the illustrated embodiment 24 and as best shown in FIG. 2, the housing wall portion 49 defines on its outer side a pair of concentrically-arranged annular projections 70. These annular projections 70 and the protruding side face 73 of the ring 65 are accepted by corresponding grooves defined in the end cover 38 so that the surfaces of the annular projection 70 and the protruding side face 73 provide, in part, one side of the passageway 88.

Figure 4:
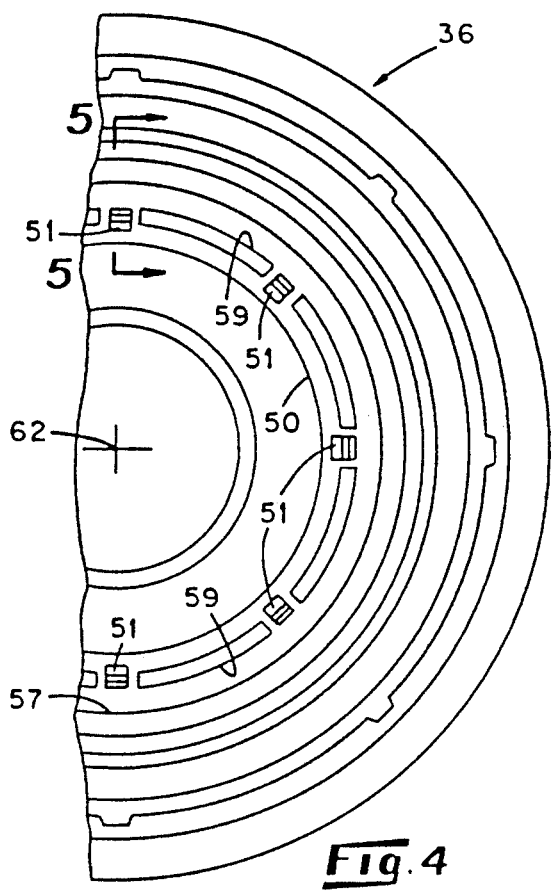
FIG. 4 is a fragmentary side elevational view of the housing of the FIG. 2 assembly as viewed along line 4—4 of FIG. 3.

With reference to FIGS. 2-4, the end cover 38 includes a disc portion 82 positioned adjacent the outer side of the wall 49 in which the annular projections 70 are defined and a shaft-receiving hub portion 84 located centrally of the disc portion 82. Like the housing 36, the end cover 38 is constructed of a hard plastic material, such as a Nylon ®. The inner face of the disc portion 82 includes annular tongues 86 which are received by grooves defined between the housing projections 70 and protruding side face 73 of the ring 65 so as to interfit and form with the projections 70 and ring side face 73 the labyrinth passageway 88. As best shown in FIG. 2, the labyrinth passageway 88 extends radially across the housing 36 from the central opening 48 defined therein to an entryway, indicated as 89, adjacent the housing periphery 44. The labyrinth passageway 88 provides a tortuous path along which dirt, liquids or other undesirable contaminants must travel in order to reach the bearing 40, and it is the provision of such a tortuous path which inhibits movement of the contaminants to the bearing 40 from the entryway 89. To further protect the bearing 40 from contaminants, the inner face of the disc portion 82 also includes an annular tongue 90 about which a seal 92 is positioned and the hub portion 84 is enclosed at one end by an end cap 94 positionable over so as to cover the end 25 (FIG. 2) of the shaft 26.

With reference to FIGS. 2 and 3, the hub portion 84 of the end cover 36 includes a body 100 which is tightly received by the bore 41 of the bearing inner race 31 and includes means for preventing axial movement of the end cover 38 relative to the inner race 31. In this connection, the hub portion body 100 is proportioned so that the bearing inner race 31 is tightly positioned thereabout and so that a shoulder portion 102 is provided along the outer surface of the hub body 100 as shown in FIGS. 2 and 3. The shoulder portion 102 provides an axially-facing abutment surface 104 which is positioned in abutting relationship with one face 39 of the bearing inner race 31, as shown as FIG. 2.

In order to prevent axial movement of the end cover 38 relative to the bearing inner race 31, the end cover 38 also includes a plurality of finger members 106 joined to the end cover body 100 for engaging the face 37 of the bearing inner race 31 so that the bearing inner race 31 is captured between the abutment surface 104 of the shoulder portion 102 and the finger members 106. In this connection and as best shown in FIG. 7, each finger member 106 includes a major portion 108 which extends substantially linearly from the hub portion body 100 in a direction which is substantially parallel to the rotational axis 62 (FIG. 6) of the housing 36 about the end cover 38, and includes a tab 112 at the end of the major portion 108 opposite the body 100. Each tab 112 includes a generally outwardly-directed surface 114 for abutting the face 37 of the bearing inner race 31. As best shown in FIG. 7, each tab surface 114 is shaped to accommodate the corner radius of the bearing inner race 31. In the interests of this invention, the area of the tab surfaces 114 which abut the bearing face 37 comprise another abutment surface which generally opposes and cooperates with the shoulder abutment surface 104 to maintain the bearing race 31 in position about the hub body portion 100.

In the illustrated assembly 24, the end cover 38 includes four finger members 106 which are regularly spaced about the shaft-receiving opening, indicated as 110, of the hub portion 84. In addition, the faces 37, 39 of the bearing inner race 31 are simultaneously engaged, respectively, by the shoulder abutment surface 104 and the tab surfaces 114 when the bearing 40 is positioned about the hub portion body 100. Accordingly, the distance as measured between the shoulder abutment surface 104 to the tab surfaces 114 corresponds to the width of the inner race 31. Therefore, when positioned between the shoulder abutment surface 104 and the tab surfaces 114, the bearing 40 is tightly held therebetween and prevented from moving axially relative to and along the length of the hub portion body 100.

It is a feature of the assembly 20 that the finger members 106 are adapted to resiliently flex radially inwardly relative to the hub portion body 100 from an unflexed condition to accommodate the placement of a bearing 40 upon the hub portion body 100 during assembly and return to an unflexed condition when the bearing is positioned upon the hub portion body 100 so that its tab surfaces 114 are positioned in abutting engagement with the face 37 of the bearing outer race 31. To this end, each finger member 106 is relatively narrow in width and constructed of an appropriate material, e.g., Nylon ®, so that the finger members 106 may be forcible flexed radially inwardly from an unflexed condition as illustrated in solid lines in FIG. 7 to a flexed condition as illustrated in phantom in FIG. 7. The finger members 106 possess sufficient resiliency so that upon removal of the force from the finger members 106 which effected the flexure, the memory of the finger members 106 return the finger members 106 to the unflexed condition.

To facilitate the flexing of the finger members 106 inwardly as the bearing 40 is positioned upon the hub portion body 100, each tab 112 includes an end surface 118 which is sloped in the manner shown in FIG. 7. When positioning the bearing 40 about the hub portion body 100, the bearing 40 is aligned with the shaft-receiving opening 110 and arranged so that the face 39 of its inner race 31 is positioned in engagement with the tab sloped surfaces 118 and then forcibly moved over the hub portion body 100 until the bearing face 39 abuts the shoulder abutment surface 104. As the bearing 40 is moved onto the hub portion body 100, the inner race 31 and the tabs 112 act as cam and cam followers, respectively, so that the inner (bore) surface 41 of the race 31 moves along the sloped surfaces 118 in the manner forcing the tabs 112 radially inwardly to the FIG. 7 flexed condition. When the inner race 31 engages the shoulder abutment surface 104, the tabs 112 clear the bearing inner surface 41 and the memory of the finger members 106 return the finger members 106 to the FIG. 7 unflexed condition so that the tab surfaces 114 are positioned in abutting engagement with the face 39 of the inner race 31.

When the bearing assembly 24 is in its assembled condition as illustrated in FIG. 2, the tabs 51 of the housing 36 and the tabs 106 of the end cover 38 engage bearing faces 45 and 37, respectively, located on opposite sides of the bearing 40. Consequently, when putting the assembly 24 together, the bearing 40 is moved relative to the housing body 50 into the recess 56 is a direction which is opposite the direction in which the bearing 40 is moved relative to and upon the hub portion body 100.

Figure 6:
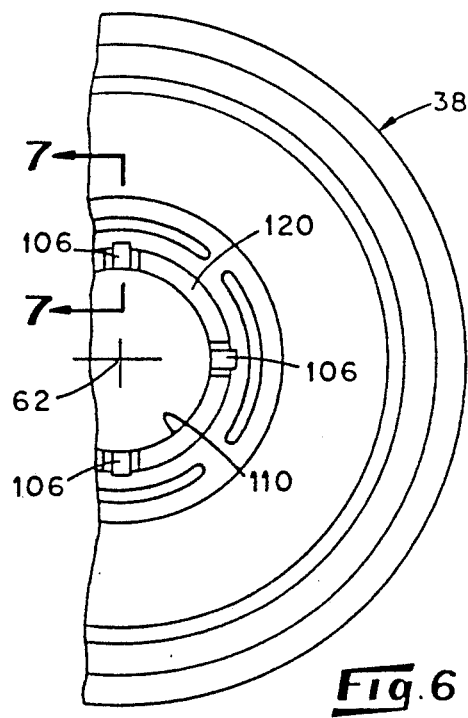
FIG. 6 is a fragmentary side elevational view of the end cap of the FIG. 2 assembly as viewed along line 6—6 of FIG. 3.
Figure 7:
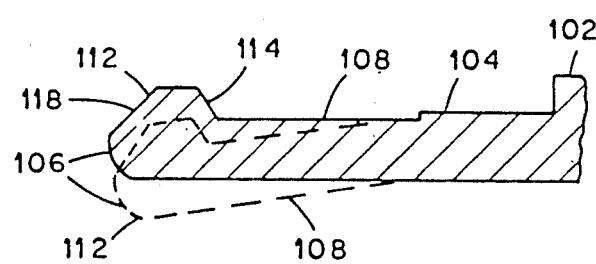
FIG. 7 is a fragmentary cross-sectional view taken along line 7—7 of FIG. 6.

As best shown in FIG. 6, the hub portion body 100 includes a rigid section 120 positioned between adjacent finger members 106 so as to substantially fill the space therebetween. These rigid sections 120 provide suitable outer surfaces for engaging the inner (bore) surface 41 of the bearing inner race 31 and suitable outer surfaces for engaging the outer surface of the shaft 26 when the shaft-receiving opening 110 is positioned thereabout.

When the finger members 106 are in the FIG. 7 unflexed condition and as best viewed in FIG. 6, the shaft-receiving opening 110 possess a circular cross section for snugly accepting the cylindrical surface of the shaft 26 when the shaft 26 is inserted endwise therein. However, when the finger members 106 are moved inwardly to the FIG. 7 flexed condition, the tabs 112 of the finger members 106 are moved inwardly into the aforementioned cross section of the opening 110. Therefore, upon positioning the hub portion body 100 about the shaft 26, the tabs 112 of the finger members 106 are prevented by the surface of the shaft 26 from flexing inwardly to the FIG. 7 flexed condition which may otherwise permit the bearing 40 to shift axially relative to and off of the hub portion body 100. Therefore, the bearing 40 cannot be removed from the hub portion body 100 as long as the assembly 24 remains positioned upon the shaft 26.

To enhance the protection of the bearing 40 from dirt or other contaminants which may migrate toward the bearing 40 along the labyrinth passageway 88 (FIG. 2), a seal 92, mentioned earlier, is positioned within the passageway 88 between the passageway entryway 89 and the bearing 40. As best shown in FIG. 3, the seal 92 is a V-ring type of seal having a ring-like body 122 adapted to be snugly positioned about the annular tongue 90 of the end cover disc portion 82 and an annular lip 124 integrally joined to the body 122. When the seal body 122 is positioned about the annular tongue 90 and the bearing assembly 24 is assembled as shown in FIG. 2, the annular lip 124 engages the face 45 of the bearing outer race 33 so that the passageway entryway 89 and inner componentry of the bearing 40 are separated by the seal 92. It follows that the seal 92 is positioned about the annular tongue 90 of the end cover 38 before the bearing 40 is placed about the hub portion body 100.

It is understood from the foregoing that the aforedescribed embodiment 24 accomplishes the intended purposes and objects of the invention. More specifically, a bearing assembly 24 is described having a housing 36 and end cover 38 which each include a plurality of finger members 51 or 106 for positioning in a snap-fit relationship with the outer race 33 or inner race 31 of a bearing 40. The housing 36 and end cover 38 also include appropriate abutment surfaces 60 or 104, and the finger members 51 or 106 include tab surfaces 63 or 114 which generally oppose a corresponding one of the abutment surfaces 60 or 104. When the bearing 40 is positioned between the abutment surface 60 and tab surfaces 63, the bearing outer race 33 is captured by the housing 36. A ring 65 positioned about the housing finger members 51 prevents the bearing 40 from separating from the housing 36. When the bearing 40 is positioned between the abutment surface 104 and the tab surfaces 114, the bearing inner ring 31 is captured by the end cover 38. When the end cover 38 is positioned about the shaft 26, the shaft surface prevents the bearing 40 from separating from the end cover 38. Consequently, when the bearing assembly 24 is in use about the shaft 26, the housing 36, bearing 40 and end cover 38 are prevented from separating from one another.

It will be understood that numerous modifications and substitutions can be had to the aforedescribed embodiment 24 without departing from the spirit of the invention. Accordingly, the aforedescribed embodiment 24 is intended for the purpose of illustration and not as limitation.

We claim:

1. A bearing assembly for rotatably supporting a roller tube of a conveyor about a fixed shaft comprising:
   a housing defining a central opening arrangeable about a fixed shaft and a periphery about which a conveyor roller tube is positionable for rotation with the housing about the fixed shaft;
   an end cover having a disc portion positioned adjacent one side of the housing and a shaft-receiving hub portion joined to the disc portion and positionable about the shaft in a stationary condition therewith; and
   a bearing positioned within the central opening of the housing and about the shaft for permitting rotation of the housing relative to the shaft and end cover; and
   the housing including a body encircling the bearing and defining a shoulder surface for abutting one face of the bearing and further including a plurality of finger members joined to the housing body so as to be spaced about the central opening, each of the finger members including a major portion which extends from the housing body and a tab joined to the end of the major portion opposite the housing body, each tab providing a tab surface for abutting the other face of the bearing opposite said one face, the bearing being positioned between said shoulder surface and said tab surfaces so that the shoulder surface and tab surfaces are positioned in abutting relationship with a corresponding face of the bearing and so that the axial movement of the bearing relative to and through the housing central opening is limited by the shoulder surface and tab surfaces;
   the tabs of the finger members adapted to resiliently flex radially outwardly relative to the housing body when the bearing is moved into the central opening to accommodate the insertion of the bearing into the central opening during assembly and so that upon positioning said one face of the bearing in abutting relationship with said shoulder surface, the memory of the finger members returns the tabs radially inwardly relative to the housing body so that the tab surface of each tab is moved into abutting relationship with said other face of the bearing.

2. The assembly as defined in claim 1 wherein the bearing includes an inner race and an outer race adapted to rotate relative to one another, and the bearing is captured between the shoulder surface and the tab surfaces so that the opposite faces of the outer race are in abutting relationship therewith and so that the inner race remains free to rotate relative to the outer race.

3. The assembly as defined in claim 1 wherein the shoulder surface encircles the central opening and is arranged in a first radial plane of said housing, and the major portion of each finger member extends substantially linearly from said first radial plane along a path oriented generally parallel to the rotational axis of the housing relative to the end cover.

4. The assembly as defined in claim 1 wherein the shoulder surface is continuous as a path is traced around the central opening and along the shoulder surface.

5. The assembly as defined in claim 1 wherein the finger members are regularly spaced about the central opening and the housing body includes relatively rigid sections positioned between adjacent finger members for substantially filling the space therebetween.

6. The assembly as defined in claim 1 wherein the housing body includes a section encircling the central opening which is shaped so as to provide an annular space encircling the finger members for accommodating the aforesaid outward flexing of the finger member tabs when the bearing is moved into position between the shoulder surface and the tab surfaces during assembly, and said bearing assembly further includes:
a ring positionable within said annular space following the positioning of the bearing between the shoulder surface and the tab surfaces for preventing the finger member tabs from flexing radially outwardly to a condition at which said bearing can be moved out of the central opening through a space provided between the finger member tabs.

7. The assembly as defined in claim 6 wherein each finger member extends substantially linearly from the housing body portion in a direction which is parallel to the rotational axis of said housing and said annular space opens generally in the same direction in which the finger members extend for receiving the ring when inserted facewise therein.

8. The assembly as defined in claim 6 wherein the ring includes a portion which protrudes out of said annular space when the ring is inserted therein and the disc portion of the end cover defines an annular groove which opens generally toward said one side of said housing and which receives the protruding portion of the ring.

9. A bearing assembly for rotatably supporting a roller tube of a conveyor about a fixed shaft comprising:
a housing defining a central opening arrangeable about a fixed shaft and a periphery about which a conveyor roller tube is positionable for rotation with the housing about the fixed shaft;
an end cover having a disc portion positioned adjacent one side of the housing and a shaft-receiving hub portion joined to the disc portion and having a shaft-receiving opening positionable about the shaft so that the hub portion is in a stationary condition therewith; and
a bearing positioned within the central opening of the housing and about the shaft for permitting rotation of the housing relative to the shaft and end cover, the bearing including an inner race and an outer race adapted to rotate relative to one another and each of the inner and outer races having faces on opposite sides of the bearing;
the housing including a body encircling the bearing and defining a shoulder surface for abutting one face of the bearing outer race and further including a plurality of finger members joined to the housing body so as to be spaced about the central opening, each of the housing finger members including a major portion which extends from the housing body and a tab joined to the end of the major portion opposite the housing body, each housing tab providing a tab surface for abutting the other face of the bearing outer race opposite said one face, the bearing being positioned between the shoulder surface and the tab surfaces of the housing so that the shoulder surface and tab surfaces of the housing are positioned in abutting relationship with a corresponding face of the bearing outer race and so that the axial movement of the bearing outer race relative to and through the housing central opening is limited by the shoulder surface and tab surfaces of the housing;
the tabs of the housing finger members adapted to resiliently flex radially outwardly relative to the housing body when the bearing is moved into the central opening to accommodate the insertion of the bearing into the central opening during assembly and so that upon positioning said one face of the bearing outer race in abutting relationship with said shoulder surface, the memory of the housing finger members returns the tabs thereof radially inwardly relative to the housing body so that the tab surface of each of the housing tabs is moved into abutting relationship with said other face of the bearing outer race;
the hub portion including a body encircled by the bearing and defining an abutment surface for abutting a first face of the bearing inner race and further including a plurality of finger members joined to said hub portion body so as to be spaced about the shaft-receiving opening of the hub portion, each of the hub portion finger members including a major section which extends from the hub portion body and a tab joined to the end of said major section opposite the hub portion body, each hub portion tab providing a tab surface for abutting a second face of the bearing inner race opposite said first face, the bearing being positioned between the abutment surface and the tab surfaces of the hub portion so that the abutment surface and the tab surfaces of the hub portion are positioned in abutting relationship with a corresponding face of the bearing inner race so that the axial movement of the bearing inner race relative to and along the hub portion is limited by the abutment surface and tab surfaces of the hub portion;
the tabs of the hub portion finger members adapted to resiliently flex radially inwardly relative to the hub portion when the bearing is moved thereupon to accommodate the placement of the bearing about the hub portion body during assembly and so that upon positioning said first face of the bearing inner race into abutting relationship with the abutment surface, the memory of the hub portion finger members returns the tabs thereof radially outwardly relative to the hub portion body so that the tab surface of each of the hub portion tabs is moved into abutting relationship with said second face of the bearing inner race.

10. The assembly as defined in claim 9 wherein said one face of the bearing outer race and said first face of the bearing inner race are on opposite sides of the bearing from one another so that during assembly of the bearing assembly, the bearing is moved relative to the housing body into the central opening in one direction and the bearing is moved relative to and upon the hub portion body in a direction opposite said one direction.

* * * * *